(No Model.)

L. O. STEVENS.
LINK FOR CHAIN CONVEYERS.

No. 299,592. Patented June 3, 1884.

Witnesses:
J. C. Stone
G. Krausser Jr.

Inventor:
Lucius O. Stevens
by Brenneman & Rohde
attys

UNITED STATES PATENT OFFICE.

LUCIUS O. STEVENS, OF BURLINGTON, IOWA, ASSIGNOR OF ONE-HALF TO GEORGE H. LANE, OF SAME PLACE.

LINK FOR CHAIN CONVEYERS.

SPECIFICATION forming part of Letters Patent No. 299,592, dated June 3, 1884.

Application filed January 28, 1884. (No model.)

*To all whom it may concern:*

Be it known that I, LUCIUS O. STEVENS, a citizen of the United States, residing at Burlington, Des Moines county, Iowa, have invented a new and useful Improvement in Links for Chain Conveyers, of which the following is a specification.

The object of my invention is to furnish a link for chain conveyers which cannot pull apart; and the nature of my invention is a link, of any suitable material, in halves, each provided with perforated shoulders, to hold and sustain a perforated push-plate. This I accomplish by the device hereinafter set forth and described.

Figure 1:
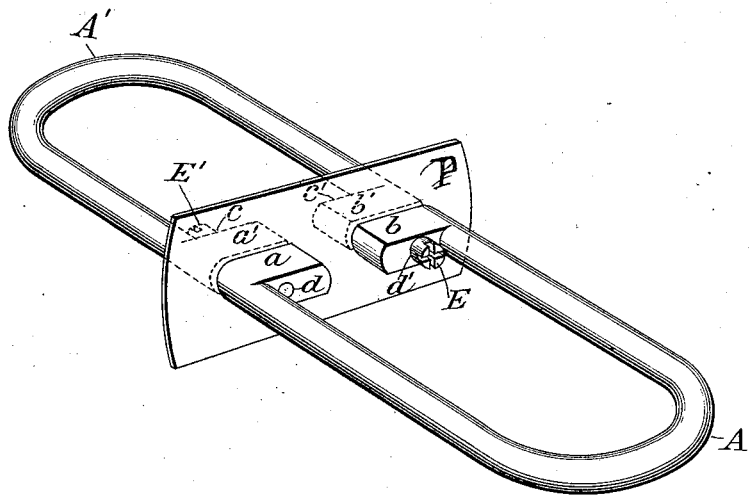
Figure 2:
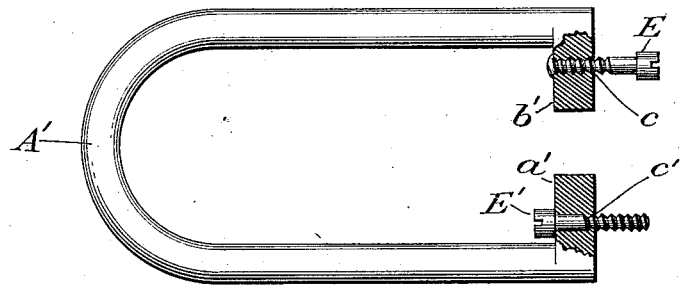

In the drawings, Figure 1 is a perspective face view of the entire device, with the push-plate in position. Fig. 2 is a horizontal cross-section through the shoulders of a half-link.

Identical letters refer to similar parts.

In the drawings, A and A' are half-links, provided, respectively, with the shoulders $a$ and $a'$ and $b$ and $b'$, turned inwardly, outwardly, or placed in any suitable position, and having the perforations $c$ and $c'$ and $d$ and $d'$. These shoulders are in one piece with their respective half-links. P is the push-plate. The shoulders $a$ and $b'$, in opposite sides of the link and of the push-plate, are made smaller than the shoulders $a'$ and $b$, for the purpose of admitting other links in the chain. The perforations in the shoulders are either threaded with female screws or bored smooth, or one is screw-threaded and its fellow on the opposite side of the push-plate is smooth-bored.

E and E' are bolts inserted through the shoulders $a$ and $b$ and $a'$ and $b'$ and the push-plate P, each from opposite sides of the push-plate, preferably; or they may be both inserted from the same side. It is evident that the bolts may be entirely smooth, part screw-threaded, or entirely screw-threaded, to correspond with the female screws in the shoulders. The end of each bolt is either riveted upon the shoulder from which it emerges or is provided with a jam-nut.

The operation of my invention is as follows: The half-links are brought together with the push-plate between them, so that the perforations in the shoulders and the push-plates will correspond for the insertion of the bolts. After their insertion they are then riveted or provided with the jam-nut, which is screwed snugly against the shoulder to hold the push-plate firmly.

It is obvious that I can use any suitable method of fastening the bolts, that the perforations and bolts may be of any shape, and that the shoulders may be of one size.

I am aware that a link has been made of two halves, each provided with two shoulders, and that the shoulders of one half abut against those of the other. These two halves are held together by a plate having lugs which engage the shoulders of the link, the whole being held together by a sleeve which encompasses the link and the plate.

I am also aware that a link has been devised consisting of two halves, and that the halves are held together by two turn-buckles. In my device the halves are held simply by a bolt or equivalent device, which passes through perforations in the shoulders. By this construction there is virtually a plain open link, all the space within the bar of the link being open, and the parts are held closely and firmly together. There is no chance of their working loose, and if the securing device should become broken it can be replaced at slight cost.

What I claim is—

1. A link for chain conveyers, consisting of two parts or halves, each half provided with two separate perforated shoulders, the shoulders of one half abutting against those of the other half, and united by a securing device, which is held in perforations of said shoulders, as set forth.

2. A link for chain conveyers, consisting of two parts or halves, A A', provided with the shoulders $a$ $a'$ and $b$ $b'$, respectively, each shoulder having perforations $c$ and $c'$, $d$ and and $d'$, united by suitable locking-bolts inserted through the perforations, in combination with a push-plate, P, substantially as set forth.

LUCIUS O. STEVENS.

Witnesses:
N. S. HAMMACK,
JOS. C. STONE.